US012719514B2

(12) United States Patent
Kutz et al.

(10) Patent No.: US 12,719,514 B2
(45) Date of Patent: Aug. 25, 2026

(54) ROBUST LOW COMPLEXITY DIGITAL POST DISTORTION TECHNIQUE

(71) Applicant: QUALCOMM Incorporated, San Diego, CA (US)

(72) Inventors: Gideon Shlomo Kutz, Ramat Hasharon (IL); Amit Bar-Or Tillinger, Tel-Aviv (IL); Lior Uziel, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 18/361,381

(22) Filed: Jul. 28, 2023

(65) Prior Publication Data

US 2025/0038775 A1 Jan. 30, 2025

(51) Int. Cl.
*H04B 1/04* (2006.01)
*H04L 5/00* (2006.01)
*H04W 72/231* (2023.01)
*H04W 72/542* (2023.01)

(52) U.S. Cl.
CPC ......... *H04B 1/0475* (2013.01); *H04L 5/0048* (2013.01); *H04W 72/231* (2023.01); *H04W 72/542* (2023.01); *H04B 2001/0433* (2013.01)

(58) Field of Classification Search
CPC . H04W 52/42; H04W 72/541; H04W 72/232; H04W 72/231; H04W 72/542; H04B 1/0475; H04B 2001/0433; H04B 7/0634; H04B 1/04; H04L 5/0048; H04L 5/0055; G06N 3/04; G01R 33/3692
See application file for complete search history.

(56) References Cited

U.S. PATENT DOCUMENTS

2020/0249292 A1* 8/2020 Biber ..................... G01R 33/36
2022/0217017 A1 7/2022 Zach et al.
2022/0312244 A1 9/2022 Landis et al.
2023/0109257 A1* 4/2023 Rydén ..................... H03M 7/30 341/50
2023/0163794 A1 5/2023 Meir et al.
2024/0097844 A1* 3/2024 Baldemair ............ H04L 27/262
2024/0297695 A1* 9/2024 Enescu ................ H04B 7/0617

FOREIGN PATENT DOCUMENTS

WO 2023287549 A1 1/2023

OTHER PUBLICATIONS

International Search Report and Written Opinion—PCT/US2024/034340—ISA/EPO—Oct. 7, 2024.

* cited by examiner

*Primary Examiner* — Iqbal Zaidi
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration for receiving or calculating an interference parameter based, at least in part, on one or more estimated power delay profiles (PDPs), one or more precoding rules, and one or more kernels, the one or more estimated PDPs being associated with one or more communication channels. The UE may receive a configuration for applying the interference parameter to a transmission having a power near a compression point of a power amplifier to reduce transmission non-linearities. Numerous other aspects are described.

29 Claims, 11 Drawing Sheets

PDP

Generate Random Channels 605

Generate Random Data 610

Precoding Rule

Precode 620

Calculate Interference *I(x)* 625

Kernels 615

Kernel Types

Least Squares 630

*B(n)*

635

Calculate Average Interference *I(x)* 640

+

Receiver 510

Tx Path 502

$H_{DMRS}$ 645

ROBUST LOW COMPLEXITY DIGITAL POST DISTORTION TECHNIQUE

FIELD OF THE DISCLOSURE

Aspects of the present disclosure generally relate to wireless communication and to techniques and apparatuses for digital post distortion.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include one or more memories and one or more processors coupled to the one or more memories. The one or more processors may be configured to receive a configuration for receiving or calculating an interference parameter based, at least in part, on one or more estimated power delay profiles (PDPs), one or more precoding rules, and one or more kernels, the one or more estimated PDPs being associated with one or more communication channels. The one or more processors may be configured to receive a configuration for applying the interference parameter to a transmission having a power near a compression point of a power amplifier to reduce transmission non-linearities.

Some aspects described herein relate to an apparatus for wireless communication at a network node. The apparatus may include one or more memories and one or more processors coupled to the one or more memories. The one or more processors may be configured to transmit, or configure a UE to calculate, an interference parameter based, at least in part, on one or more estimated PDPs, one or more precoding rules, and one or more kernels, the one or more estimated PDPs being associated with one or more communication channels. The one or more processors may be configured to configure the UE to apply the interference parameter to a transmission having a power near a compression point of a power amplifier to reduce transmission non-linearities.

Some aspects described herein relate to a method of wireless communication performed by a UE. The method may include receiving a configuration for receiving or calculating an interference parameter based, at least in part, on one or more estimated PDPs, one or more precoding rules, and one or more kernels, the one or more estimated PDPs being associated with one or more communication channels. The method may include receiving a configuration for applying the interference parameter to a transmission having a power near a compression point of a power amplifier to reduce transmission non-linearities.

Some aspects described herein relate to a method of wireless communication performed by a network node. The method may include transmitting, or configuring a UE to calculate, an interference parameter based, at least in part, on one or more estimated PDPs, one or more precoding rules, and one or more kernels, the one or more estimated PDPs being associated with one or more communication channels. The method may include configuring the UE to apply the interference parameter to a transmission having a power near a compression point of a power amplifier to reduce transmission non-linearities.

Some aspects described herein relate to a non-transitory computer-readable medium that stores a set of instructions for wireless communication by a UE. The set of instructions, when executed by one or more processors of the UE, may cause the UE to receive a configuration for receiving or calculating an interference parameter based, at least in part, on one or more estimated PDPs, one or more precoding rules, and one or more kernels, the one or more estimated PDPs being associated with one or more communication channels. The set of instructions, when executed by one or more processors of the UE, may cause the UE to receive a configuration for applying the interference parameter to a transmission having a power near a compression point of a power amplifier to reduce transmission non-linearities.

Some aspects described herein relate to a non-transitory computer-readable medium that stores a set of instructions for wireless communication by a network node. The set of instructions, when executed by one or more processors of the network node, may cause the network node to transmit, or configure a UE to calculate, an interference parameter based, at least in part, on one or more estimated PDPs, one or more precoding rules, and one or more kernels, the one or more estimated PDPs being associated with one or more communication channels. The set of instructions, when executed by one or more processors of the network node, may cause the network node to configure the UE to apply the interference parameter to a transmission having a power near a compression point of a power amplifier to reduce transmission non-linearities.

Some aspects described herein relate to an apparatus for wireless communication. The apparatus may include means for receiving a configuration for receiving or calculating an interference parameter based, at least in part, on one or more estimated PDPs, one or more precoding rules, and one or more kernels, the one or more estimated PDPs being associated with one or more communication channels. The apparatus may include means for receiving a configuration for applying the interference parameter to a transmission having a power near a compression point of a power amplifier to reduce transmission non-linearities.

Some aspects described herein relate to an apparatus for wireless communication. The apparatus may include means for transmitting, or configuring a UE to calculate, an interference parameter based, at least in part, on one or more estimated PDPs, one or more precoding rules, and one or more kernels, the one or more estimated PDPs being associated with one or more communication channels. The apparatus may include means for configuring the UE to apply the interference parameter to a transmission having a power near a compression point of a power amplifier to reduce transmission non-linearities.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
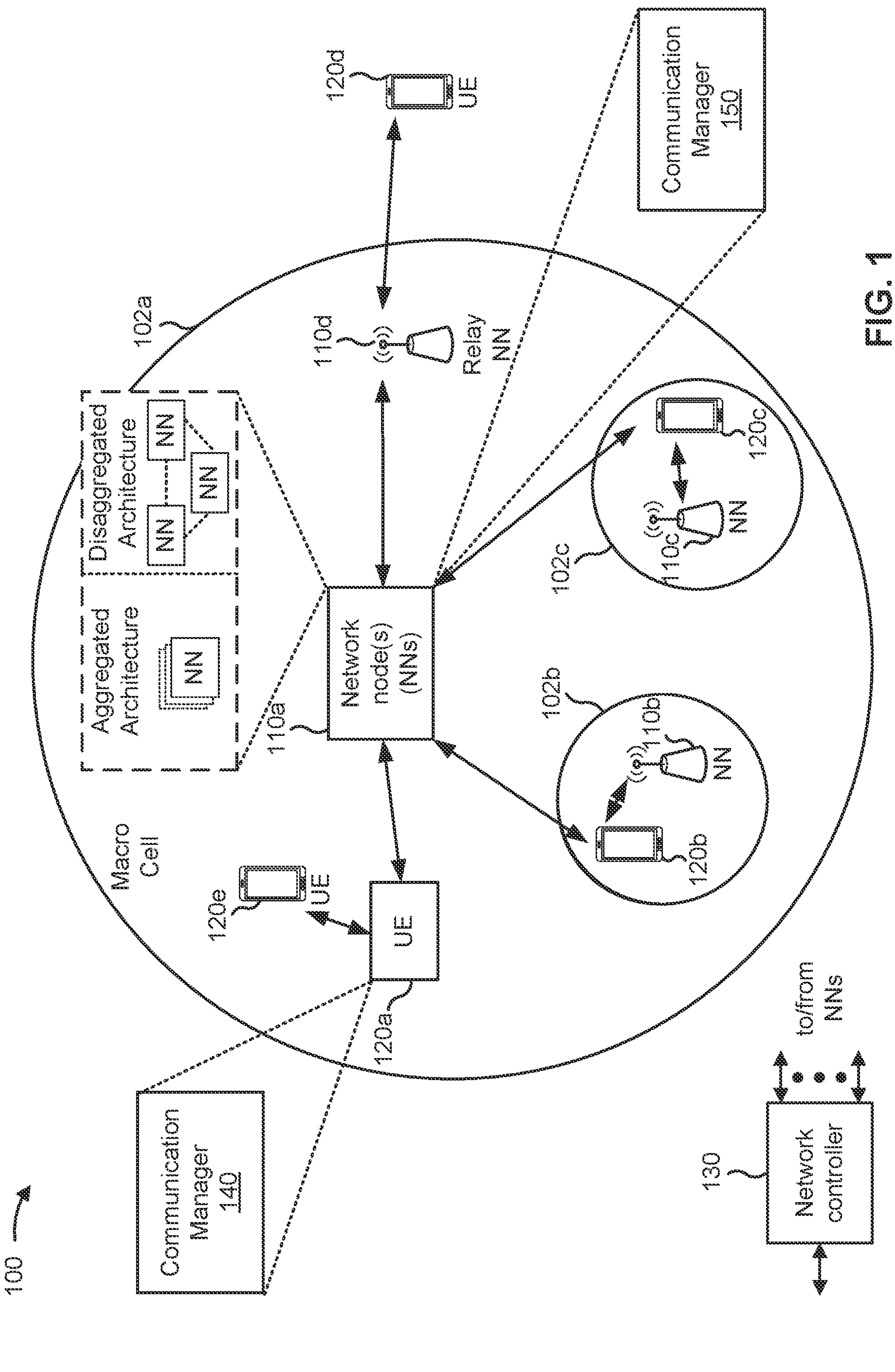
FIG. 1 is a diagram illustrating an example of a wireless network, in accordance with the present disclosure.

Digital post distortion (DPoD) can mitigate effects of transmitting signals near a power amplifier (PA). When the PA operates at or near its saturation point, distortion is introduced into the transmitted signal, resulting in out-of-band radiation and in-band distortion. This not only degrades the quality of service but also causes interference with adjacent channels. DPoD techniques, performed by the transmitting device, introduce an inverse non-linearity to transmitted signals prior to amplification, effectively pre-distorting the signal and counteract the PA's distortion effects. Model parameters used when applying the DPoD technique are periodically updated based on feedback from the receiver to improve performance.

Various aspects relate generally to DPoD techniques. Some aspects more specifically relate to a low-complexity DPoD technique applicable to complex use cases such as those featuring arbitrary precoding and/or a mixture of antenna power delay profiles. In some examples, a user equipment receives a configuration for receiving or calculating an interference parameter based, at least in part, on one or more estimated power delay profiles (PDPs), one or more precoding rules, and one or more kernels. In some examples, a network node transmits, or configures a UE to calculate, an interference parameter based, at least in part, on one or more estimated PDPs, one or more precoding rules, and one or more kernels.

Particular aspects of the subject matter described in this disclosure can be implemented to realize one or more of the following potential advantages. In some examples, by receiving or calculating an interference parameter, the described techniques can be used to allow transmissions at higher powers with improved signal-to-noise ratios, capacity, and power consumption efficiency. In some examples, by configuring the UE to receive or calculate the interference parameter, the described techniques can be used to apply DPoD to more complex communication systems, such as systems with multiple transmitting antennas and during single user multiple input multiple output (SU-MIMO) communications.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*c*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a configuration for receiving or calculating an interference parameter based, at least in part, on one or more estimated PDPs, one or more precoding rules, and one or more kernels, the one or more estimated PDPs being associated with one or more communication channels; and receive a configuration for applying the interference parameter to a transmission having a power near a compression point of a power amplifier to reduce transmission non-linearities. Additionally, or alternatively, the communication manager 140 may perform one or more other operations described herein.

In some aspects, the network node 110 may include a communication manager 150. As described in more detail elsewhere herein, the communication manager 150 may transmit, or configuring a UE to calculate, an interference parameter based, at least in part, on one or more estimated PDPs, one or more precoding rules, and one or more kernels, the one or more estimated PDPs being associated with one or more communication channels; and configure the UE to apply the interference parameter to a transmission having a power near a compression point of a power amplifier to reduce transmission non-linearities. Additionally, or alternatively, the communication manager 150 may perform one or more other operations described herein.

As indicated above, FIG. 1 is provided as an example. Other examples may differ from what is described with regard to FIG. 1.

Figure 2:
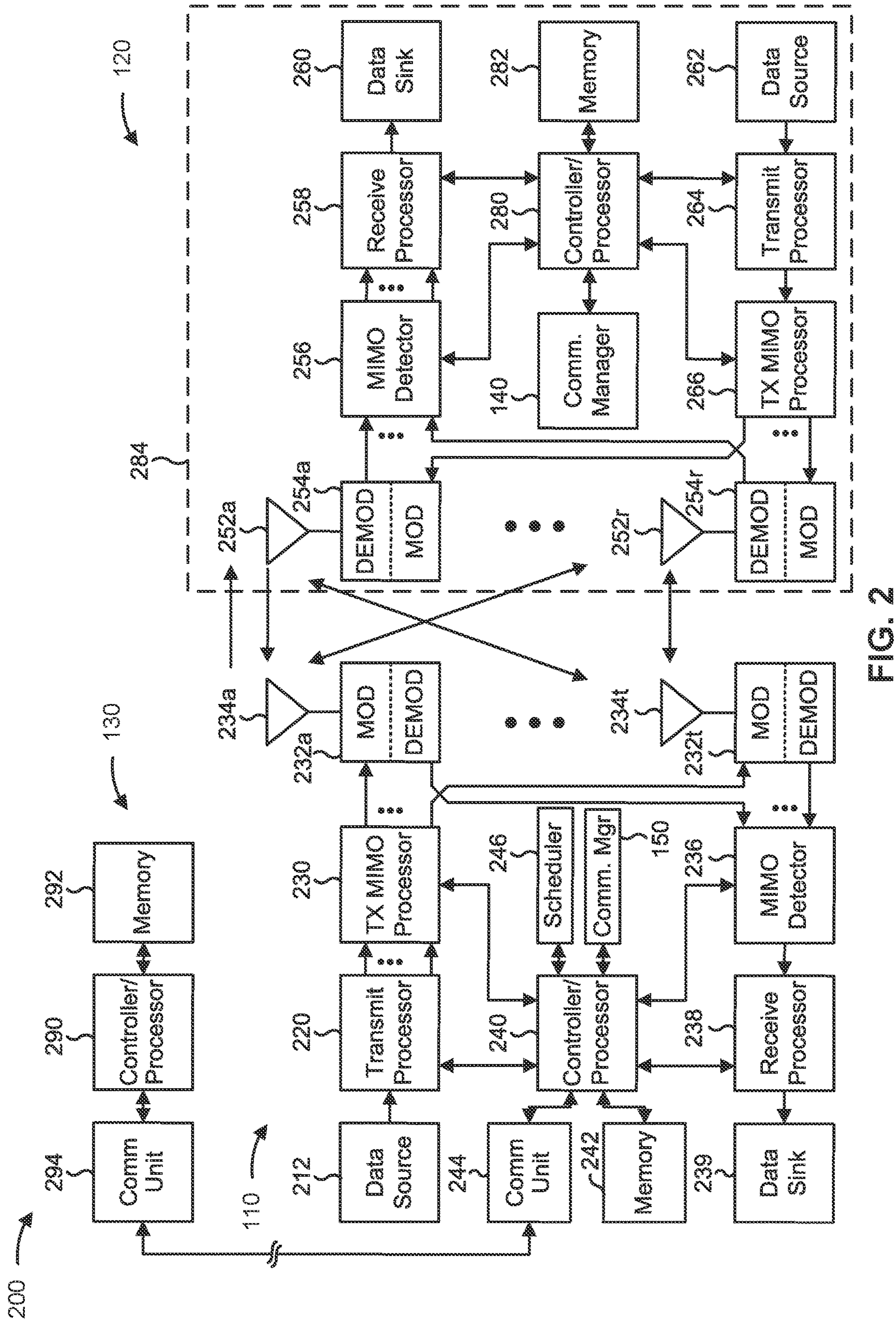
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas **234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120**, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems **232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232***a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

The controller/processor 240 of the network node 110, the controller/processor 280 of the UE 120, and/or any other component(s) of FIG. 2 may perform one or more techniques associated with digital post distortion, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE includes means for receiving a configuration for receiving or calculating an interference parameter based, at least in part, on one or more estimated PDPs, one or more precoding rules, and one or more kernels, the one or more estimated PDPs being associated with one or more communication channels; and/or means for receiving a configuration for applying the interference parameter to a transmission having a power near a compression point of a power amplifier to reduce transmission non-linearities. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting, or configuring a UE to calculate, an interference parameter based, at least in part, on one or more estimated PDPs, one or more precoding rules, and one or more kernels, the one or more estimated PDPs being associated with one or more communication channels; and/or means for configuring the UE to apply the interference parameter to a transmission having a power near a compression point of a power amplifier to reduce transmission non-linearities. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware. software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B(NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
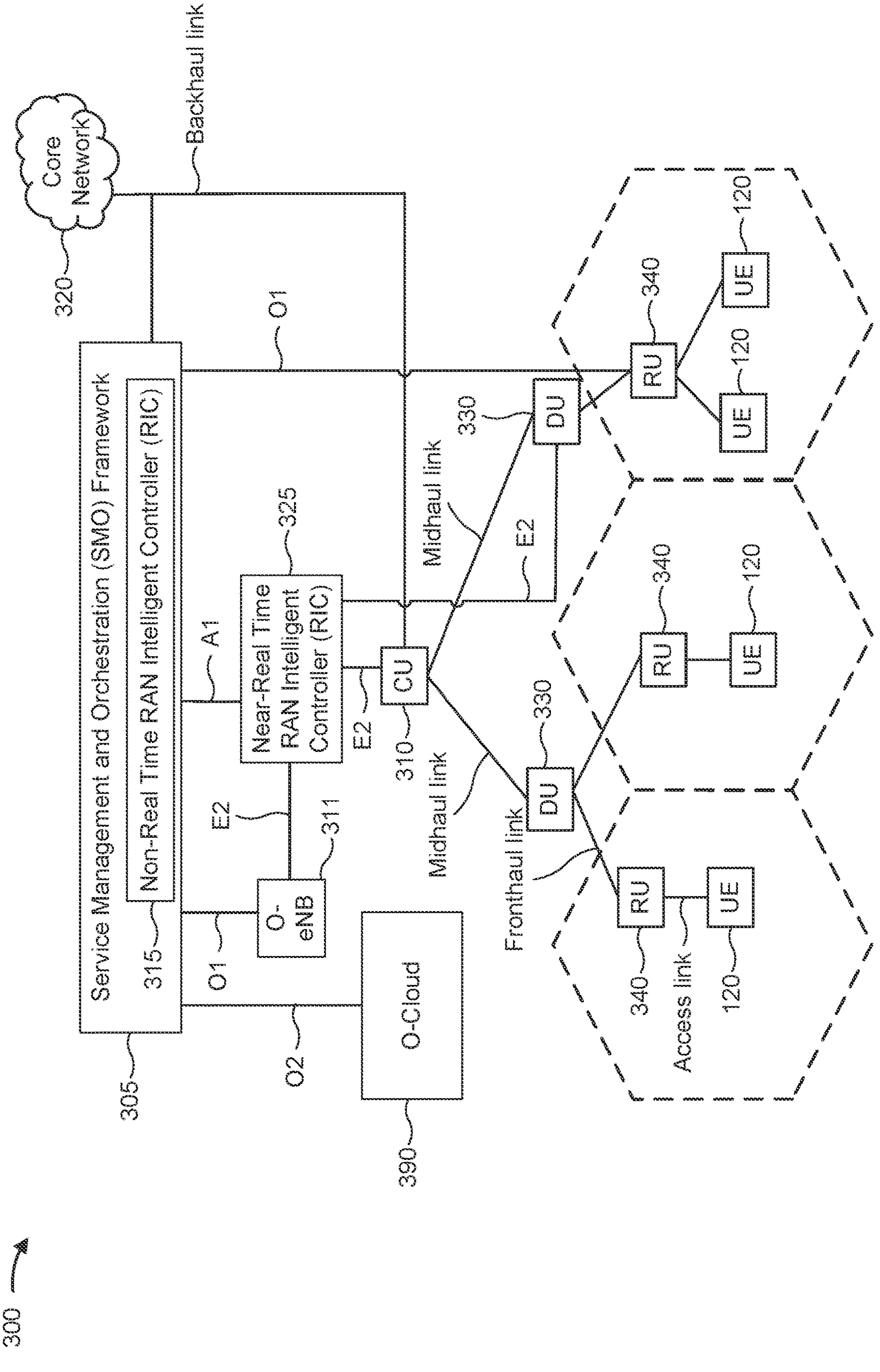
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments. an RU 340, controlled by a DU 330, may correspond to a logical node that hosts RF processing functions or low-PHY layer functions, such as performing an FFT. performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
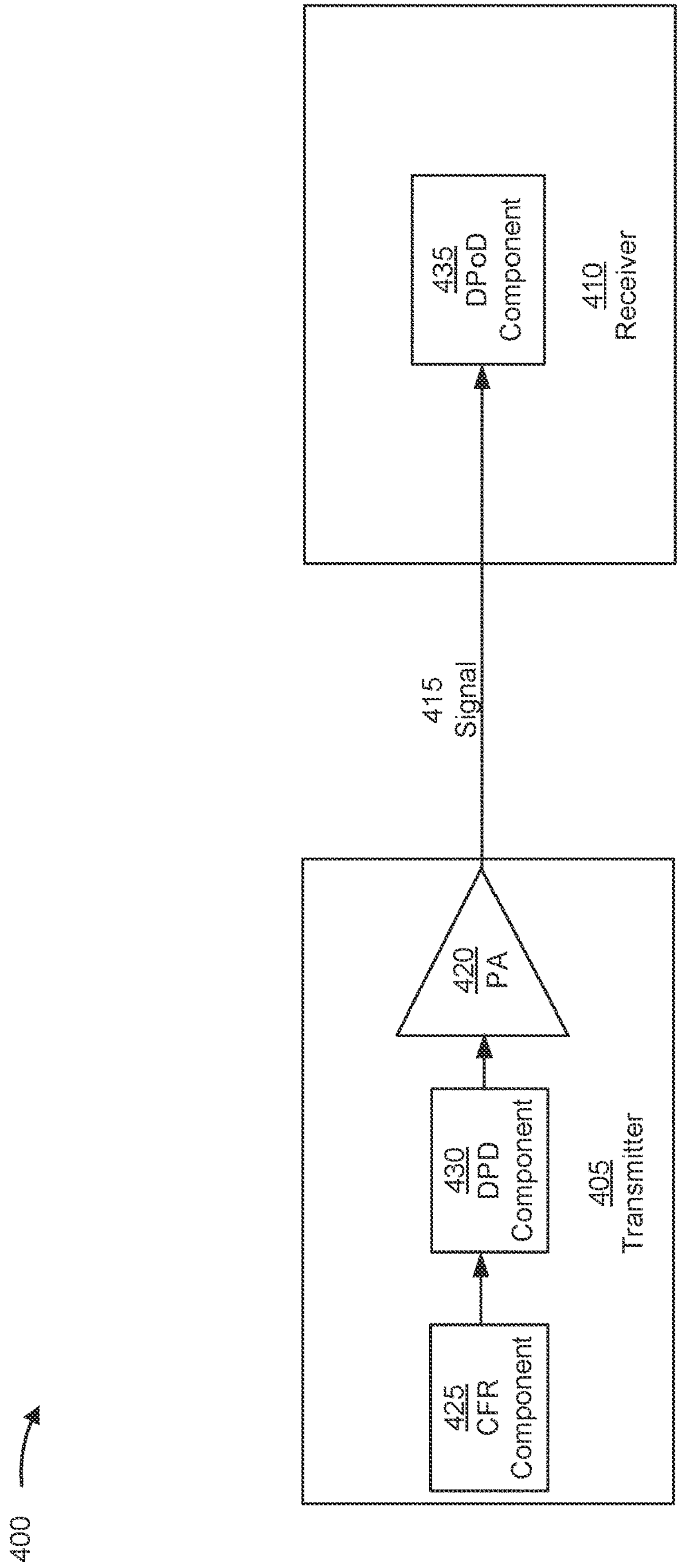
FIG. 4 is a diagram illustrating an example of components for pre-processing and post-processing a signal, in accordance with the present disclosure.

FIG. 4 is a diagram illustrating an example 400 of components for pre-processing and post-processing a signal, in accordance with the present disclosure. As shown in FIG. 4, a transmitter 405 may be in communication with a receiver 410. The transmitter 405 and the receiver 410 may be any of the wireless communication devices described herein (e.g., a UE 120, a network node 110, a CU 310, a DU 330, an RU 340, or the like), or may be located at any of the wireless communication devices described herein.

As shown, the transmitter 405 may communicate with the receiver 410, and, more particularly, the transmitter 405 may send a signal 415 to the receiver 410. The signal 415 may be pre-processed by the transmitter 405 to compress a peak to average power ratio (PAPR) associated with the signal in order to reduce a power-back off value associated with transmission of the signal 415 to the receiver 410, among other reasons.

More particularly, in some communications systems, the transmitter 405 may include non-linear components, such as a PA 420 with a limited dynamic range that may distort a transmitted signal as a result of a relatively high PAPR. The non-linear distortion may be an in-band distortion, which affects link performance in connection with mutual information and/or an error vector magnitude (EVM) amount, or an out-band distortion, which causes adjacent channel interference (ACI) and/or results in a high adjacent channel leakage ratio (ACLR) (e.g., the transmitted signal interferes with other signals on neighboring frequency bands, with the ACI and/or ACLR indicating how much the adjacent channel is polluted by a main transmission). To avoid non-linear distortions and accompanying interference, the transmitter 405 may apply a power back-off value to reduce transmit power, thereby reducing non-linearity.

However, applying a power back-off value may result in reduced power efficiency (e.g., less available transmit power is used to transmit in a channel, thereby reducing range, a signal-to-interference-plus-noise ratio (SINR), and/or the like). Put another way, less power from the transmitter 405 is transmitted to the channel, with more power dissipated as heat, resulting in reduced power efficiency. Accordingly, the transmitter 405 may use one or more pre-processing techniques to reduce the power back-off value (e.g., to transmit close to a PA compression point). For example, the transmitter may utilize crest factor reduction (CFR) processing and/or digital pre-distortion (DPD) processing to reduce distortion. CFR processing may reduce the dynamic range of the signal, while DPD processing may reduce non-linear distortion to less than a threshold level with a reduced level of power back-off, thereby increasing power efficiency relative to avoiding non-linear distortion using only a power back-off. As shown in FIG. 4, the transmitter 405 may thus include a CFR component 425 for performing CFR processing to the signal 415 (e.g., to reduce PAPR in the signal 415 as much as possible and thus reduce the power back-off value), and/or the transmitter 405 may include a DPD component 430 for performing DPD processing to the signal 415 (e.g., to linearize the power amplifier's response).

However, CFR processing consumes additional resources (e.g., bandwidth resources, power resources, computational resources, or the like), and, in some cases, CFR processing may introduce in-band distortion (e.g., EVM distortion) and/or out-band distortion (e.g., ACI distortion). Moreover, although DPD processing may correct an in-dynamic-range non-linearity effect, non-linearity may still cause a clipping effect (e.g., resulting from the limited dynamic range). Thus, the effectiveness and/or power efficiency benefit of CFR processing and DPD processing are limited.

To account for limitations of CFR and/or DPD processing, the receiver 410 may apply DPoD processing to the signal 415. DPoD is a technique to allow the transmitter 405 to transmit close to the PA compression point by reconstructing, on the receiver 410 side, transmitter 405 non-linearities and subtracting the transmitter non-linearities from the received signal in an iterative manner. In that regard, DPoD processing may be similar to DPD processing but is performed in the receiver 410 rather than in the transmitter 405, and may be directed to processing for only EVM instead of processing for both EVM and ACI. More particularly, DPoD processing may be performed by a DPoD component 435 at the receiver 410, which may include hardware and/or software configured to implement an algorithm configured to remove non-linear noise that is generated by a known model. DPoD processing thus may allow for reduced power back-out values and greater power efficiency (e.g., measured in bits per Joules) by enabling the transmitter 405 to transmit at a higher power and thus improve the SINR and/or capacity. Aspects of examples DPoD processing techniques are described in more detail below in connection with FIG. 5.

As indicated above, FIG. 4 is provided as an example. Other examples may differ from what is described with respect to FIG. 4.

Figure 5:
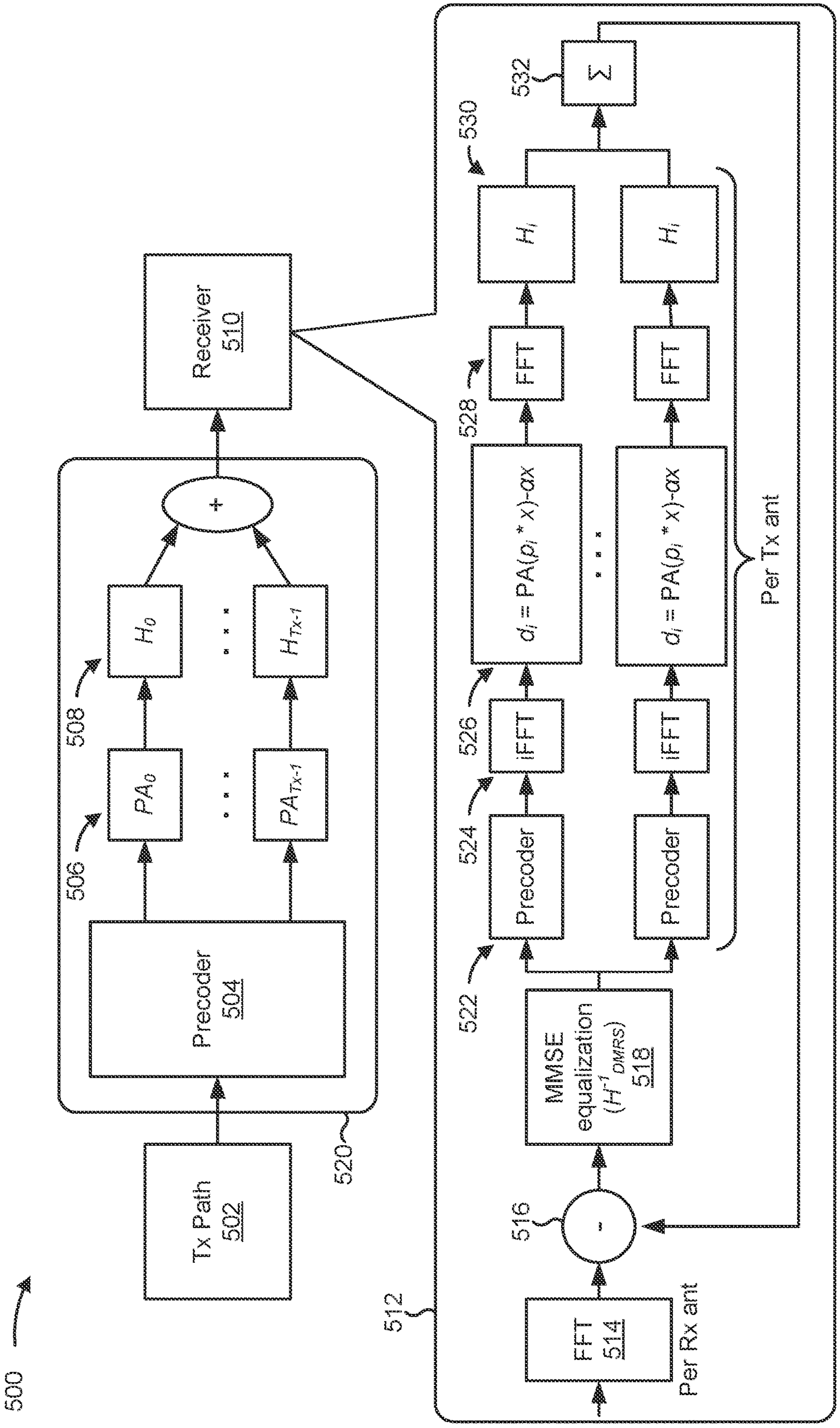
FIG. 5 is a diagram illustrating an example of digital post distortion (DPoD) processing for a multi-layer, frequency-selective precoding transmission associated with multiple transmission antennas.

FIG. 5 is a diagram illustrating an example 500 of DPoD processing for a multi-layer, frequency-selective precoding transmission associated with multiple transmission antennas.

In some examples, DPoD processing may require relatively complex signal processing techniques used for non-linear compensation at a receiver device (e.g., receiver 410), which in many cases may render DPoD processing only available for relatively simple use cases. For example, communications associated with a single-layer, no precoding signal transmitted using a single transmission antenna; communications associated with a single-layer, wide-band precoding signal transmitted using any one or more transmission antennas; and/or communications associated with a SU-MIMO, no precoding signal transmitted using a quantity of transmission antennas corresponding to a quantity of MIMO layers (sometimes referred to as $N_{layers}$), may be associated with a relatively low-complexity, time-domain (TD) iteration DPoD scheme that may be employed at the receiver side. However, communications associated with a multi-layer, frequency-selective precoding signal transmitted using multiple transmission antennas; communications associated with an SU-MIMO, wide-band precoding signal transmitted using $N_{layers}$ transmission antennas; and/or communications associated with an SU-MIMO, frequency-selective signal transmitted using $N_{layers}$ transmission antennas, may be associated with a more complex, TD iteration DPoD scheme that requires precoding knowledge at the receiver side. Moreover, communications associated with a multi-layer, frequency-selective precoding signal transmitted using many transmission antennas; communications associated with an SU-MIMO, wide-band precoding signal transmitted using many transmission antennas; and/or communications associated with an SU-MIMO, frequency-selective signal transmitted using many transmission antennas, may be associated with a high-complexity DPoD scheme that requires precoding knowledge and data-aided channel estimation at the receiver side. For example, the high-complexity DPoD scheme may require knowledge of the raw, unprecoded channel between each transmitting antenna and each receiving antenna, which is typically not available on the receiving side. Further, while data aided channel estimation may be possible, high complexity and limited performance may limit its applicability in certain use cases.

For example, FIG. 5 shows various components associated with performing high-complexity DPoD processing for multi-layer, frequency-selective precoding communications transmitted using many transmission antennas, such as a beamformed communication or a similar beamformed communication. In such examples, a signal may pass through transmission path 502 and then a precoder 504 for precoding the signal. In this example, the precoder 504 may be configured to apply frequency-selective precoding to the signal. The precoded signal may then be transmitted via multiple transmission antennas (e.g., a beamformed transmission). In that regard, the precoded signal may be provided to multiple PAs 506 (shown as $PA_0$ through $PA_{Tx-1}$, with "Tx" corresponding to the quantity of transmission antennas being used) for power amplification. The amplified signals (e.g., the signals leaving the PAs) may be transmitted via multiple channels 508 (e.g., each amplified signal may be transmitted via a respective one of multiple channels, shown as $H_0$ through $H_{Tx-1}$). The multiple signals, transmitted via the multiple channels, may be received by a receiver 510 (e.g., receiver 410), which may receive a signal corresponding to a summation of the multiple amplified signals transmitted via the multiple channels. Put another way, in some examples, the receiver 510 may receive a beamformed signal that is a summation of the signal transmitted by the multiple transmission antennas via the multiple channels ($H_0$ through $H_{Tx-1}$).

To compensate for non-linear distortions in the received signal, the receiver 510 may perform DPoD processing on the received signal, such as for a purpose of reconstructing non-linearities in the received signal and subtracting the non-linearities from the received signal in an iterative manner. For example, reference number 512 shows components associated with DPoD processing for a multi-layer, frequency-selective precoding communication associated with multiple transmission antennas (e.g., DPoD processing for a beamformed single-layer, frequency-selective precoding communication). The received signal at each reception antenna, which may be the summation of multiple precoded signals transmitted via multiple channels, may be passed through an FFT 514 in order to convert the received signal from the time domain to a representation in the frequency domain. As shown by reference number 516, non-linearities reconstructed using the DPoD processing may be subtracted from the received signal in an iterative manner, which is described in more detail below. In that regard, for a first iteration of the DPoD processing (e.g., an iteration of the DPoD processing in which no non-linearities have been previously reconstructed), the received signal may not be altered by the operations shown by reference number 516.

The receiver 510 may next perform a minimum mean square error (MMSE) equalization processing 518 to remove the effects of the physical channel from the signal and thus estimate a data signal that was transmitted by the transmitter. In that regard, the MMSE equalization processing 518 is sometimes referred to $H^{-1}{}_{DMRS}$ processing, because the processing is used to remove channel effects (e.g., $H^{-1}$) based at least in part on knowledge of the channel determined using one or more reference signals (e.g., one or more DMRSs). In order to best estimate the non-linearities in the signal, the receiver 510 may then replicate, at the receiver 510, the transmitter-side operations shown within the rounded-corner box indicated by reference number 520 in FIG. 5 (e.g., precoding, power amplification, and channel transmission).

In this regard, following the MMSE equalization processing 518, the receiver 510 may use precoders 522 to precode the signal in a similar manner as described above in connection with the precoder 504 of the transmitter. The receiver 510 may then perform a series of processing steps for each transmission antenna, which, for certain beamformed communications, may be a large quantity of antennas (e.g., in some aspects, the transmitter may use 64 or more transmission antennas). More particularly, for each branch (e.g., for each transmission antenna), the receiver 510 may pass the precoded signal through an iFFT 524 in order to convert the precoded signal from the frequency domain to a representation in the time domain. Moreover, for each branch, the receiver 510 may calculate a distortion (shown as $d_i$) caused by a respective PA associated with each transmission antenna. For example, the receiver 510 may input a convolution of the signal (shown as "x" in FIG. 5) and an antenna-specific precoding (shown as "$p_i$" in FIG. 5) through a non-linear function of the PA associated with the transmission antenna (shown as "$PA(p_i \otimes x)$" in FIG. 5), and may subtract an input signal, scaled accordingly to a certain factor (shown as $\alpha x$ in FIG. 5). Put another way, the estimated distortion associated with a respective transmission antenna can be calculated at the receiver 510 as $d_i = PA(p_i \otimes x) - \alpha x$. The estimated distortion may correspond to distortion present in a signal outputted from a corresponding PA 506 (e.g., one of $PA_0$ through $PA_{Tx-1}$), prior to any additional distortion and/or interference caused by a physical channel (e.g., one of $H_0$ through $H_{Tx-1}$) during transmission.

The receiver 510 may, for each branch, pass the calculated distortion through an FFT 528 in order to convert the estimated distortion from the representation in the time domain to a representation in the frequency domain, and then may multiply the estimated distortion with a representation of the channel 530 for the particular antenna (shown as "$H_i$" in FIG. 5). As shown by reference number 532, the receiver 510 may sum the products of the estimated distortion for each transmission antenna and the representation of the channel 530 for the particular antenna (e.g., $d_i \times H_i$), resulting in an estimation of the overall non-linear distortion of the signal received by receiver 510 at a particular reception antenna. As shown by reference number 516, the estimation of the overall non-linear distortion may be subtracted from the received signal to compensate for the non-linearities at the receiver 510. The DPoD processing steps may be repeated in an iterative manner in order more accurately cancel non-linearities from the received signal.

In this regard, a complexity of DPoD processing associated with certain communications, such as a multi-layer, frequency-selective precoding communication that is transmitted using multiple transmission antennas, is very high, because the DPoD processing steps are proportional to a number of transmission antennas used (sometimes referred to as $N_{Tx}$), which may be numerous (e.g., 64 antennas, 128 antennas, 256 antennas, or the like). For example, for k iterations of the above-described DPoD processing steps, a number of executions associated with an extra FFT step (e.g., the operations described above in connection with FFT 528) may be $N_{Tx} \times k$ executions, a number of executions associated with an iFFT step (e.g., the operations described above in connection with iFFT 524) may be $N_{Tx} \times k$ executions, and/or a number of executions associated with PA modeling (e.g., the operations described above in connection with reference number 526) may be $N_{Tx} \times k$ executions. Accordingly, DPoD processing certain communications may result in high power, computing, and other resource consumption at the receiver.

Moreover, certain DPoD processing (such as the DPoD processing described above in connection with FIG. 5, which involves frequency-selective precoding) may require knowledge, at the receiver, of a precoder per antenna (e.g., $p_i$) used by the transmitter, which is typically transparent to the receiver. Accordingly, certain DPoD processing may require excessive signaling of side information (e.g., indications of per-antenna precoding used), resulting in high signaling overhead and thus reduced bandwidth, high latency, and otherwise inefficient usage of network resources.

Moreover, certain DPoD processing (such as the DPoD processing described above in connection with FIG. 5) may require raw channel estimation per antenna (e.g., an estimation of the channel prior to precoding), such as an estimation of the channels (e.g., $H_i$), which may not be readily available at the receiver. Accordingly, certain DPoD processing may require deriving an estimation of the per-antenna channel from data-aided methods that may be relatively complex and thus result in additional power, computing, and other resource consumption at the receiver. In some examples, estimating the per-antenna channels at receiver may be practically prohibitive, resulting in DPoD processing being unavailable for certain types of communications (e.g., certain beamformed communications, such as single-layer, frequency-selective precoding communications associated with multiple transmission antennas or similar communications).

As indicated above, FIG. 5 is provided as an example. Other examples may differ from what is described with respect to FIG. 5.

Figure 6:
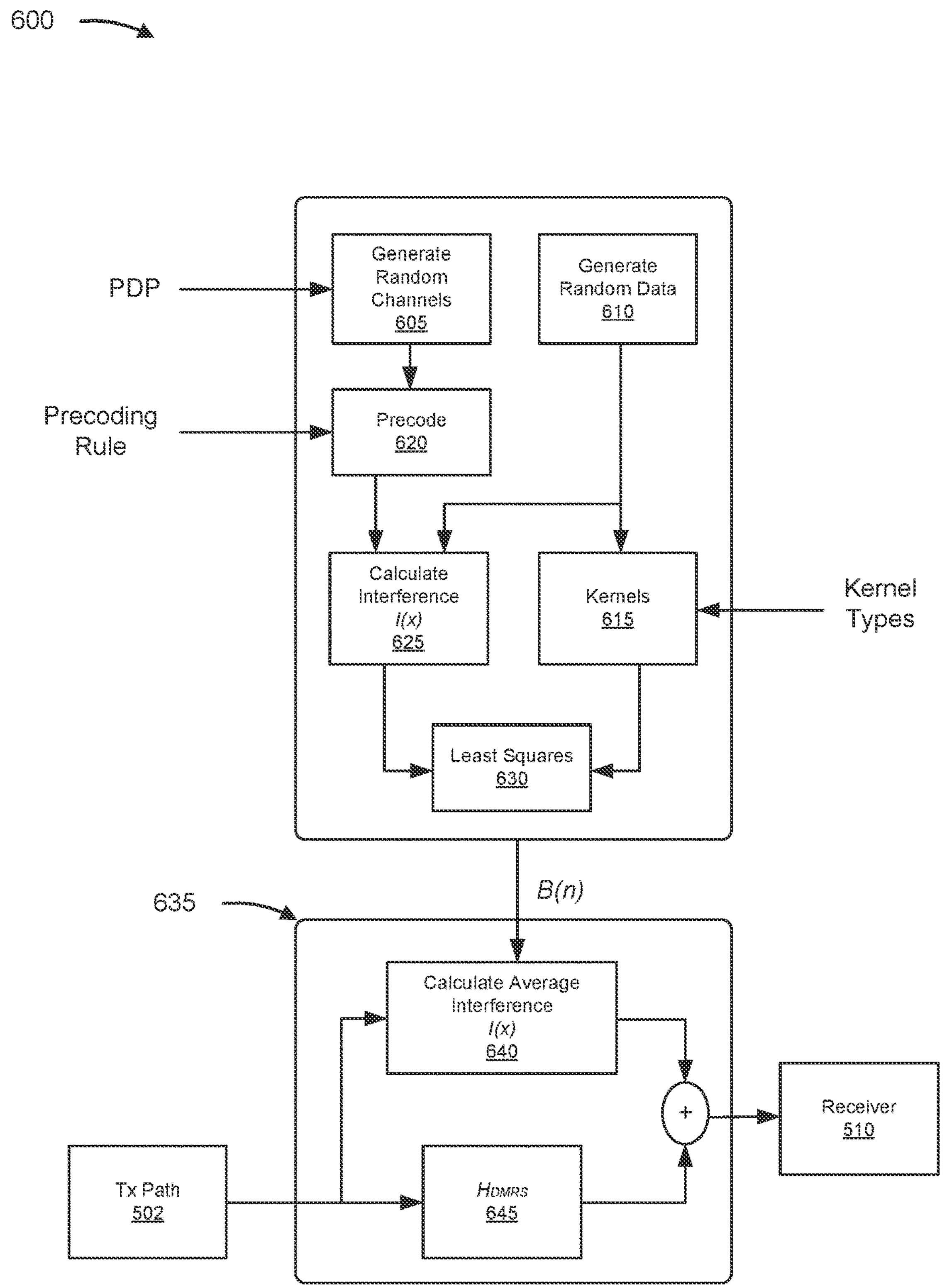
FIG. 6 is a diagram illustrating an example associated with DPoD for multi-layer, multi-antenna, frequency selection precoding, in accordance with the present disclosure.

FIG. 6 is a diagram illustrating an example 600 associated with DPoD for multi-layer, multi-antenna, frequency selection precoding, in accordance with the present disclosure. Example 600 includes communication between a transmitter (e.g., transmitter 405 and/or a network node 110) and a receiver (e.g., receiver 410, receiver 510, and/or a UE 120). In some aspects, the transmitter and the receiver may be included in a wireless network, such as wireless network 100. The transmitter and the receiver may communicate via a wireless access link, which may include an uplink and a downlink.

Rather than estimate non-linearities as discussed above with respect to FIG. 5. the DPoD approach shown in example 600 may be used to determine an ergodic average of interference that can be removed in the DPoD process. The ergodic average may be based, at least in part, on one or more power delay profiles of the communication channel, one or more precoding rules, one or more kernel types, and/or a combination thereof, among other examples. For example, as shown by reference number 605, the network node 110 or UE 120 may generate random channels based, at least in part, on one or more PDPs. As shown by reference number 610, the network node 110 or UE 120 may generate random data. With regard to reference number 615, the network node 110 or UE 120 may use the random data and kernel types to create n number of kernels with the nth kernel being defined as $K(n)=|x(t+n)|^2x(t)$, for example. Other kernels may be applied for more complex channel models and/or interference terms. As shown by reference number 620, the network node 110 or UE 120 may apply a precoding technique to the random channels generated in accordance with one or more precoding rules. As shown by reference number 625, interference I(x) may be calculated for a single layer based, at least in part, on the precoded output and the random data generated. As shown by reference number 630, the network node 110 or UE 120 may calculate a kernel coefficient by applying a least squares technique to the interference I(x) calculated with respect to reference number 625 and the kernels generated with respect to reference number 630. The output of the least squares technique may be referred to as a non-linear interference parameter B(n), representing the calculated average interface, and may be output to the model 635. The non-linear interference parameter B(n), in conjunction with the signal on the transmission path 502. may be used to calculate and remove the average interference as shown with regard to reference number 640. The signal on the transmission path 502 may be further applied to the precoded channel $H_{DMRS}$ for reference signals as shown by reference number 645. The sum of the outputs of the average interference and the precoded channel may be provided to the receiver 510.

Accordingly, the model 635 may treat the combined non-linear interference effects from each PA as an average non-linear interference (I(x)). The signal that is received at the receiver 510 may be modeled as a signal leaving the transmission path 502, convolved with the combined, precoded channel (e.g., $H_{DMRS}$), and summed with the average interference (e.g., I(x)), effectively removing the average interference from the input signal.

As indicated above, FIG. 6 is provided as an example. Other examples may differ from what is described with respect to FIG. 6.

Figure 7:
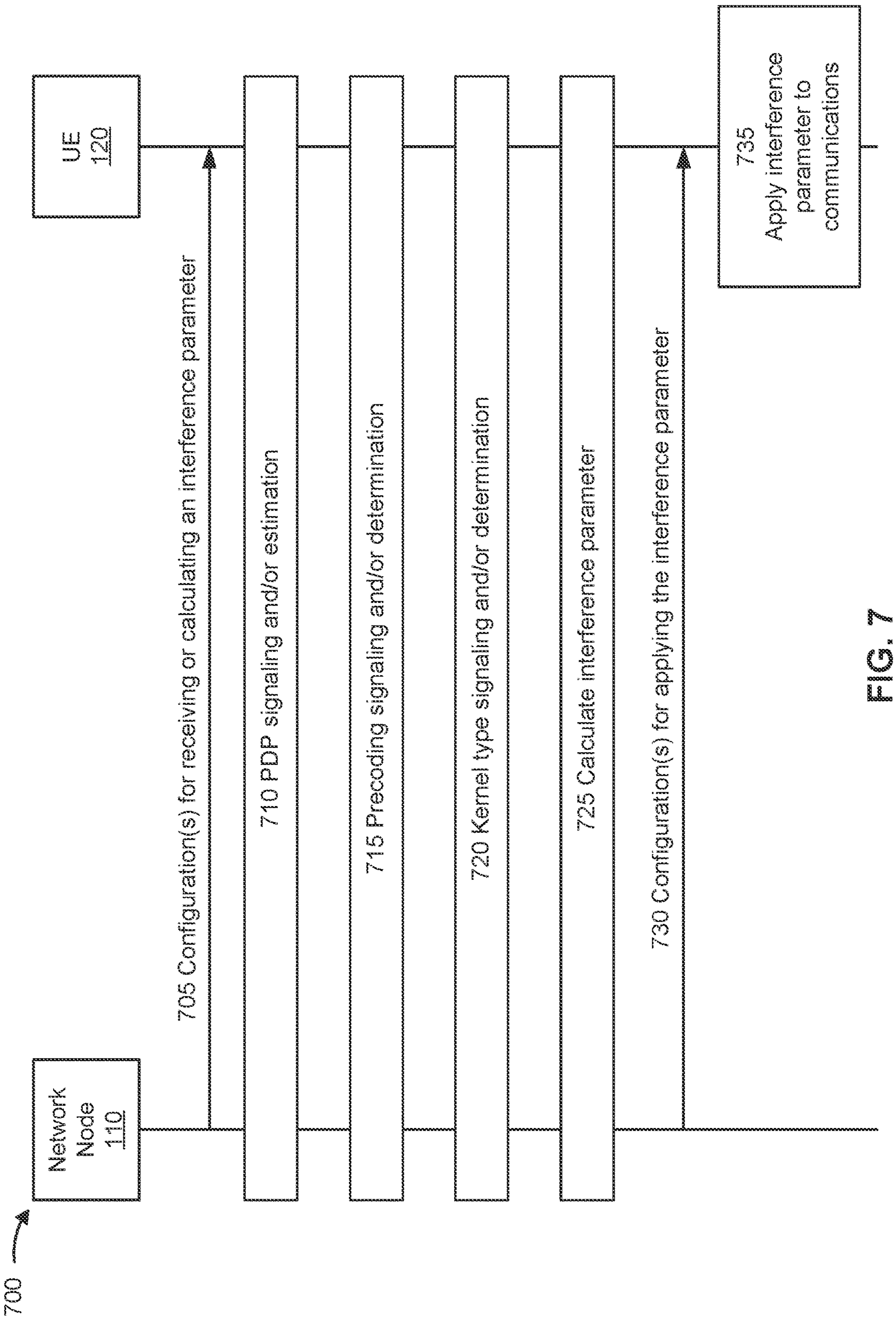
FIG. 7 is a diagram illustrating an example associated with a DPoD technique for reducing interference, in accordance with the present disclosure.

FIG. 7 is a diagram illustrating an example 700 associated with a DPoD technique for reducing interference, in accordance with the present disclosure. As shown in FIG. 7, a network node 110 and a UE 120 may communicate with one another.

As shown by reference number 705, the network node 110 may transmit, and the UE 120 may receive, a configuration for receiving or calculating the interference parameter, which may be the non-linear interference parameter B(n), discussed above. The interference parameter may be based, at least in part, on one or more estimated PDPs, one or more precoding rules, and one or more kernels. Each of the one or more estimated PDPs may be associated with one or more communication channels. In some aspects, the configuration for receiving or calculating the interference parameter may include a configuration for randomly generating the one or more communication channels based, at least in part, on the estimated PDPs, generating one or more precoded channels, generating random data, calculating a single-layer interference, determining one or more kernels based, at least in part, on the random data and one or more kernel types, or performing a least-squares operation.

As shown by reference number 710, the network node 110 and/or the UE 120 estimate one or more PDPs. In some aspects, the PDPs may be estimated based, at least in part, on one or more channel state information reference signal (CSI-RS) measurements. For example, the network node 110 may transmit one or more CSI-RSs, the UE 120 may perform CSI-RS measurements on CSI-RSs received, and the UE 120 may transmit one or more CSI-RS reports, which may be based on the CSI-RS measurements, to the network node 110. With the CSI-RS measurements and/or CSI-RS reports, the network node 110 may estimate one or more PDPs. In some aspects, one or more CSI-RS reports may indicate an average CSI-RS measurement associated with one or more transmitting antennas.

Alternatively or in addition, the PDPs may be estimated based, at least in part, on one or more sounding reference signal (SRS) communications. When based on the SRS, the UE 120 may transmit, and the network node 110 may receive, the SRS. The network node 110 may transmit one or more estimated PDPs in response to the SRS. In some aspects, the UE 120 may receive a resource allocation for the SRS, and the resource allocation may be for a periodic, semi-persistent, or aperiodic SRS.

In some aspects, the UE 120 may receive one or more estimated PDPs. In aspects where multiple estimated PDPs are received, each of the estimated PDPs may be assigned a PDP weight by, for example, the network node 110. The PDP weight may be based, at least in part, on a number of applicable antennas (i.e., the number or percentage of antennas to which the PDP applies). In some aspects, an estimated PDP for a first group of antennas may receive a higher PDP weight than an estimated PDP for a second group of antennas with, for example, a lower number or percentage of antennas than the first group.

As shown by reference number 715, the network node 110 and/or the UE 120 may determine the precoding to be applied for the DPoD procedure. In some aspects, the network node 110 may transmit, and the UE 120 may receive, one or more precoding rules. In some aspects, the one or more precoding rules are received via an RRC message. The precoding rules may be transmitted by the network node 110 as a pseudo-code in a predefined language. For example, the precoding rules may be provided to the UE 120 in the form of an ordered list of mathematical operations done on the vector of the estimated channel. In some aspects, the precoding may not be the actual calculation performed by the network node 110 so long as the calculated interference I(x) accurately represents the expected interference. A resource grant for the RRC message with the precoding rules may be periodic or aperiodic. In some aspects, receiving the one or more precoding rules includes receiving multiple precoding rules via RRC messaging and receiving a selection of one of the multiple precoding rules via MAC control element (MAC-CE) messaging or downlink control information (DCI) messaging. The selection may be made by the network node 110 and communicated to the UE 120.

As shown by reference number 720, the network node 110 and/or the UE 120 may determine one or more kernels. For example, the network node 110 may signal one or more kernel types to the UE 120. With the kernel types, the UE 120 may be configured to determine the kernels to be used in the DPoD procedure.

As shown by reference number 725, the network node 110 and/or the UE 120 may calculate the interference parameter B(n). The interference parameter may be calculated as discussed above with respect to example 500 of FIG. 5. For example, the UE 120 or network node 110 may calculate the interference parameter B(n) by randomly generating the one or more communication channels based, at least in part, on the estimated PDPs, generating one or more precoded channels using the precoding rules, generating random data, calculating single- and/or multi-layer interference (which may include the average interference per layer), determining one or more kernels based, at least in part, on the random data and the one or more kernel types, and performing a least-squares operation.

As shown by reference number 730, the network node 110 may transmit, and the UE 120 may receive, a configuration for applying the interference parameter B(n) to transmissions. For example, the configuration may configure the UE 120 to apply the interference parameter B(n) to transmissions having a power near a compression point of a power amplifier to reduce transmission non-linearities.

As shown by reference number 735, the UE 120 may apply the interference parameter B(n) as discussed above with respect to example 500 of FIG. 5.

By applying the interference parameter B(n), the UE 120 can perform a DPoD technique in more complex situations, such as multiple layers, multiple antenna, frequency selective precoding.

As indicated above, FIG. 7 is provided as an example. Other examples may differ from what is described with respect to FIG. 7.

Figure 8:
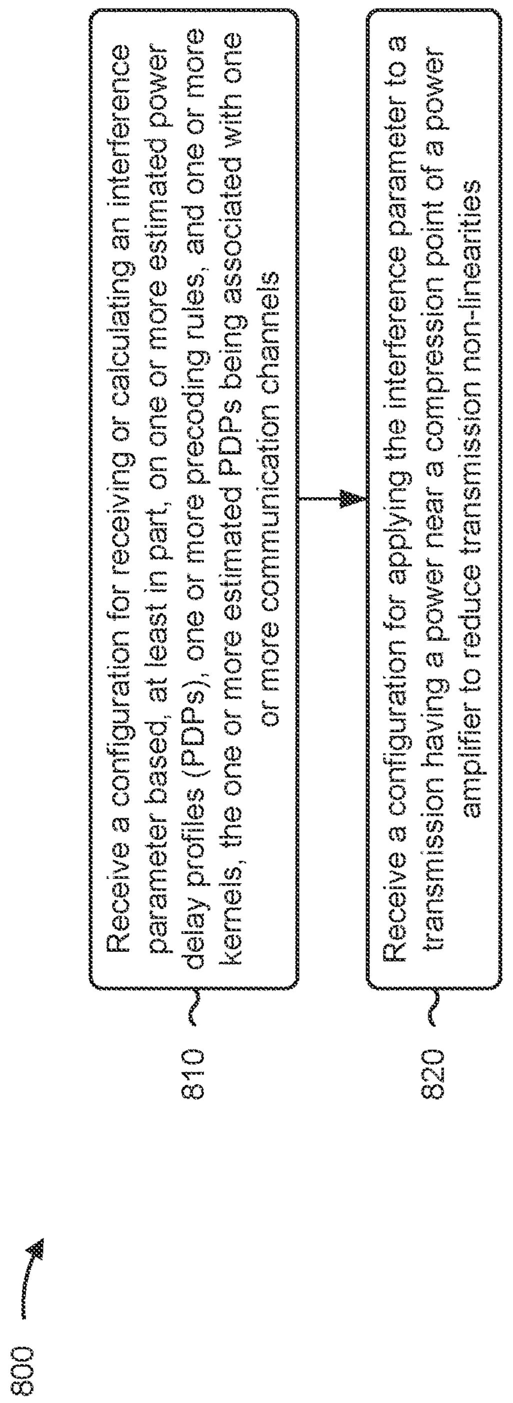
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with a robust low complexity DPoD technique.

As shown in FIG. 8, in some aspects, process 800 may include receiving a configuration for receiving or calculating an interference parameter based, at least in part, on one or more estimated PDPs, one or more precoding rules, and one or more kernels, the one or more estimated PDPs being associated with one or more communication channels (block 810). For example, the UE (e.g., using reception component 1002 and/or communication manager 1006, depicted in FIG. 10) may receive a configuration for receiving or calculating an interference parameter based, at least in part, on one or more estimated PDPs, one or more precoding rules, and one or more kernels, the one or more estimated PDPs being associated with one or more communication channels, as described above.

As further shown in FIG. 8, in some aspects, process 800 may include receiving a configuration for applying the interference parameter to a transmission having a power near a compression point of a power amplifier to reduce transmission non-linearities (block 820). For example, the UE (e.g., using reception component 1002 and/or communication manager 1006, depicted in FIG. 10) may receive a configuration for applying the interference parameter to a transmission having a power near a compression point of a power amplifier to reduce transmission non-linearities, as described above.

Process 800 may include additional aspects, such as any single aspect or any combination of aspects described below and/or in connection with one or more other processes described elsewhere herein.

In a first aspect, process 800 includes transmitting one or more CSI-RS measurements, wherein the interference parameter is based, at least in part, on the one or more CSI-RS measurements.

In a second aspect, alone or in combination with the first aspect, process 800 includes transmitting one or more PDP reports based, at least in part, on the one or more CSI-RS measurements.

In a third aspect, alone or in combination with one or more of the first and second aspects, the one or more PDP reports are based, at least in part, on an average of the one or more CSI-RS measurements associated with one or more transmitting antennas.

In a fourth aspect, alone or in combination with one or more of the first through third aspects, process 800 includes transmitting an SRS.

In a fifth aspect, alone or in combination with one or more of the first through fourth aspects, process 800 includes receiving the one or more estimated PDPs in accordance with the SRS.

In a sixth aspect, alone or in combination with one or more of the first through fifth aspects, process 800 includes receiving a resource allocation for the SRS, wherein the resource allocation is for a periodic, semi-persistent, or aperiodic SRS.

In a seventh aspect, alone or in combination with one or more of the first through sixth aspects, process 800 includes receiving the one or more estimated PDPs, wherein each of the one or more estimated PDPs is associated with a PDP weight based, at least in part, on a number of antennas in a group of applicable antennas.

In an eighth aspect, alone or in combination with one or more of the first through seventh aspects, process 800 includes receiving the one or more precoding rules.

In a ninth aspect, alone or in combination with one or more of the first through eighth aspects, the one or more precoding rules are received via a radio resource control message.

In a tenth aspect, alone or in combination with one or more of the first through ninth aspects, receiving the one or more precoding rules includes receiving multiple precoding rules via radio resource control messaging and receiving a selection of one of the multiple precoding rules via MAC-CE messaging or DCI messaging.

In an eleventh aspect, alone or in combination with one or more of the first through tenth aspects, process 800 includes receiving one or more kernel types.

In a twelfth aspect, alone or in combination with one or more of the first through eleventh aspects, the configuration for receiving or calculating the interference parameter includes a configuration for randomly generating the one or more communication channels based, at least in part, on the estimated PDPs, generating one or more precoded channels, generating random data, calculating a single-layer interference, determining one or more kernels based, at least in part, on the random data and one or more kernel types, or performing a least-squares operation.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
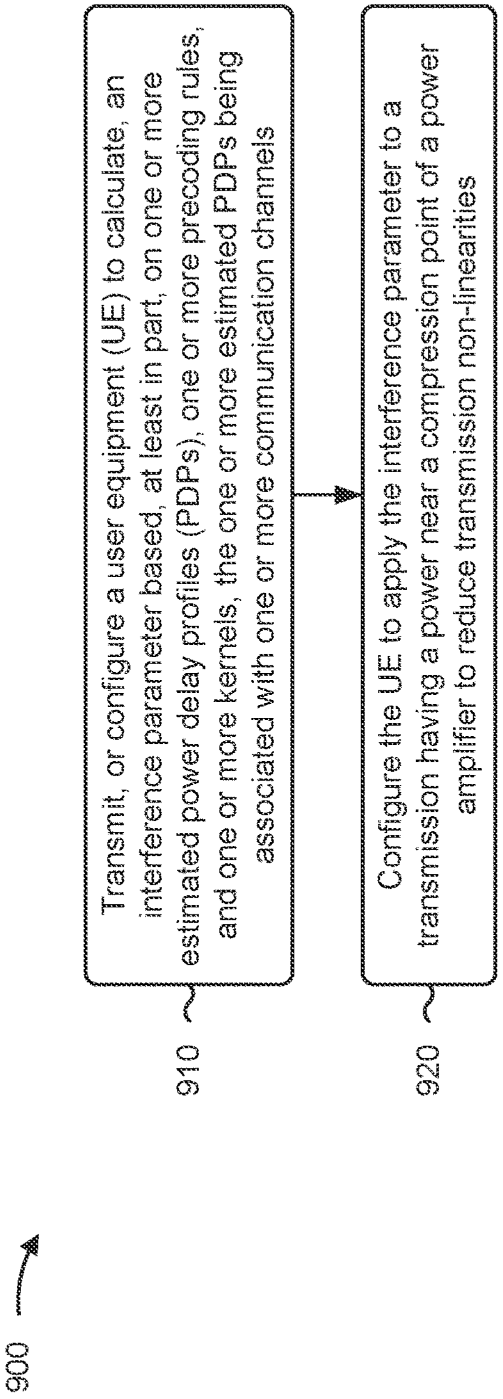
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 110) performs operations associated with a robust low complexity DPoD technique.

As shown in FIG. 9, in some aspects, process 900 may include transmitting, or configuring a UE to calculate, an interference parameter based, at least in part, on one or more estimated PDPs, one or more precoding rules, and one or more kernels, the one or more estimated PDPs being associated with one or more communication channels (block 910). For example, the network node (e.g., using transmission component 1104 and/or communication manager 1106, depicted in FIG. 11) may transmit, or configure a UE to calculate, an interference parameter based, at least in part, on one or more estimated PDPs, one or more precoding rules, and one or more kernels, the one or more estimated PDPs being associated with one or more communication channels, as described above.

As further shown in FIG. 9, in some aspects, process 900 may include configuring the UE to apply the interference parameter to a transmission having a power near a compression point of a power amplifier to reduce transmission non-linearities (block 920). For example, the network node (e.g., using communication manager 1106, depicted in FIG. 11) may configure the UE to apply the interference parameter to a transmission having a power near a compression point of a power amplifier to reduce transmission non-linearities, as described above.

Process 900 may include additional aspects, such as any single aspect or any combination of aspects described below and/or in connection with one or more other processes described elsewhere herein.

In a first aspect, process 900 includes receiving one or more CSI-RS measurements, wherein the interference parameter is based, at least in part, on the one or more CSI-RS measurements.

In a second aspect, alone or in combination with the first aspect, process 900 includes receiving one or more PDP reports based, at least in part, on the one or more CSI-RS measurements.

In a third aspect, alone or in combination with one or more of the first and second aspects, the one or more PDP reports are based, at least in part, on an average of the one or more CSI-RS measurements associated with one or more transmitting antennas.

In a fourth aspect, alone or in combination with one or more of the first through third aspects, process 900 includes receiving an SRS.

In a fifth aspect, alone or in combination with one or more of the first through fourth aspects, process 900 includes transmitting the one or more estimated PDPs in accordance with the SRS.

In a sixth aspect, alone or in combination with one or more of the first through fifth aspects, process 900 includes transmitting a resource allocation for the SRS, wherein the resource allocation is for a periodic, semi-persistent, or aperiodic SRS.

In a seventh aspect, alone or in combination with one or more of the first through sixth aspects, process 900 includes transmitting the one or more estimated PDPs, wherein each of the one or more estimated PDPs are associated with a PDP weight based, at least in part, on a number of antennas in a group of applicable antennas.

In an eighth aspect, alone or in combination with one or more of the first through seventh aspects, process 900 includes transmitting the one or more precoding rules.

In a ninth aspect, alone or in combination with one or more of the first through eighth aspects, the one or more precoding rules are transmitted via a radio resource control message.

In a tenth aspect, alone or in combination with one or more of the first through ninth aspects, transmitting the one or more precoding rules includes transmitting multiple precoding rules via radio resource control messaging and transmitting a selection of one of the multiple precoding rules via MAC-CE messaging or DCI messaging.

In an eleventh aspect, alone or in combination with one or more of the first through tenth aspects, process 900 includes transmitting one or more kernel types.

In a twelfth aspect, alone or in combination with one or more of the first through eleventh aspects, process 900 includes transmitting a configuration for calculating the interference parameter based, at least in part, on the signaling associated with the interference parameter.

In a thirteenth aspect, alone or in combination with one or more of the first through twelfth aspects, the configuration for calculating the interference parameter includes a configuration for randomly generating the one or more communication channels based, at least in part, on the estimated PDPs, generating one or more precoded channels, generating random data, calculating a single-layer interference, determining one or more kernels based, at least in part, on the random data and one or more kernel types, or performing a least-squares operation.

In a fourteenth aspect, alone or in combination with one or more of the first through thirteenth aspects, process 900 includes randomly generating the one or more communication channels based, at least in part, on the one or more estimated PDPs, applying the one or more precoding rules to the one or more communication channels to create one or more precoded channels, generating random data, calculating a single-layer interference based, at least in part, on the random data and the one or more precoded channels, determining the one or more kernels based, at least in part, on the random data and one or more kernel types, and calculating the interference parameter by applying a least-squares operation to the single-layer interference and the kernels.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
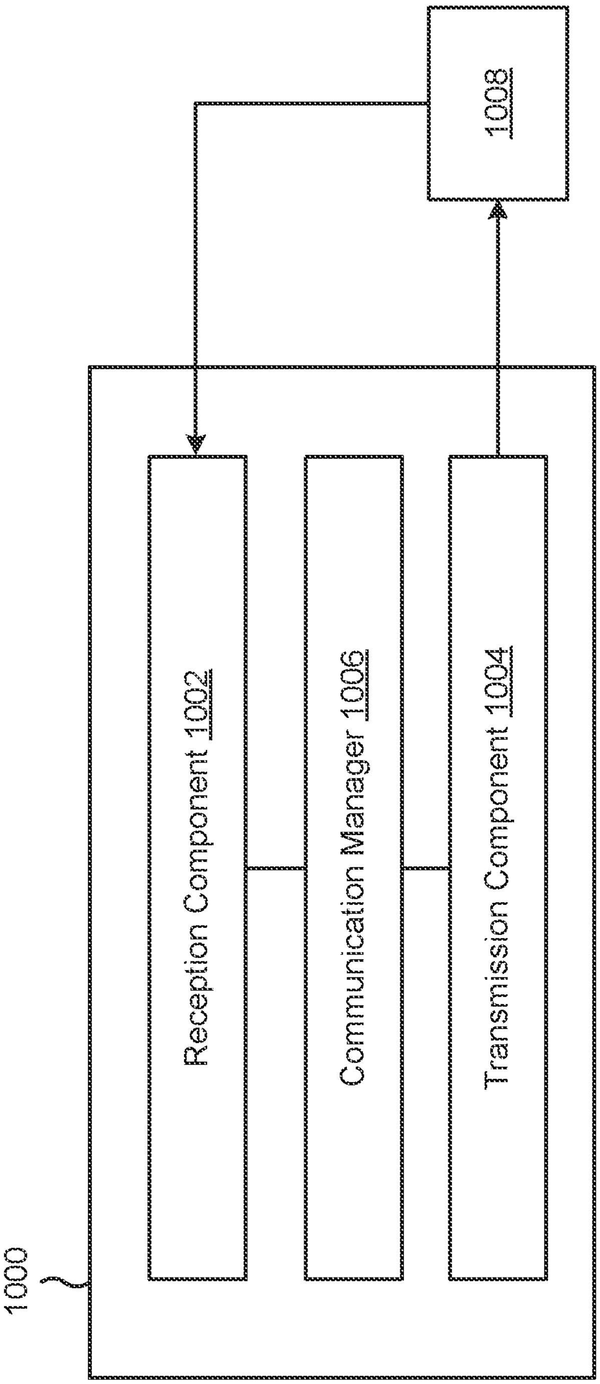
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 4-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The reception component 1002 may receive a configuration for receiving or calculating an interference parameter based, at least in part, on one or more estimated PDPs, one or more precoding rules, and one or more kernels, the one or more estimated PDPs being associated with one or more communication channels. The reception component 1002 may receive a configuration for applying the interference parameter to a transmission having a power near a compression point of a power amplifier to reduce transmission non-linearities.

The transmission component 1004 may transmit one or more CSI-RS measurements, wherein the interference parameter is based, at least in part, on the one or more CSI-RS measurements. The transmission component 1004 may transmit one or more PDP reports based, at least in part, on the one or more CSI-RS measurements. The transmission component 1004 may transmit an SRS.

The reception component 1002 may receive the one or more estimated PDPs in accordance with the SRS. The reception component 1002 may receive a resource allocation for the SRS, wherein the resource allocation is for a periodic, semi-persistent, or aperiodic SRS. The reception component 1002 may receive the one or more estimated PDPs, wherein each of the one or more estimated PDPs is associated with a PDP weight based, at least in part, on a number of antennas in a group of applicable antennas. The reception component 1002 may receive the one or more precoding rules. The reception component 1002 may receive one or more kernel types.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
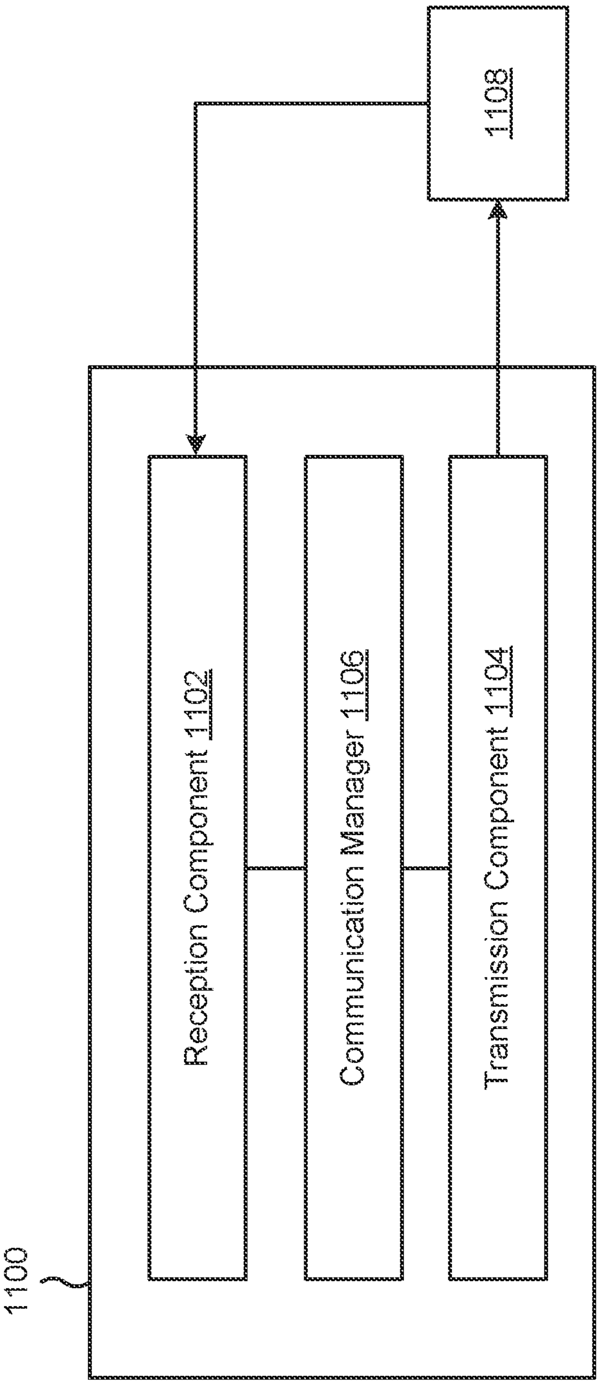
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 4-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2. In some aspects, the reception component 1102 and/or the transmission component 1104 may include or may be included in a network interface. The network interface may be configured to obtain and/or output signals for the apparatus 1100 via one or more communications links, such as a backhaul link, a midhaul link, and/or a fronthaul link.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The transmission component 1104 may transmit, or configure a UE to calculate, an interference parameter based, at least in part, on one or more estimated PDPs, one or more precoding rules, and one or more kernels, the one or more estimated PDPs being associated with one or more communication channels. The communication manager 1106 may configure the UE to apply the interference parameter to a transmission having a power near a compression point of a power amplifier to reduce transmission non-linearities.

The reception component 1102 may receive one or more CSI-RS measurements, wherein the interference parameter is based, at least in part, on the one or more CSI-RS measurements. The reception component 1102 may receive one or more PDP reports based, at least in part, on the one or more CSI-RS measurements. The reception component 1102 may receive an SRS.

The transmission component 1104 may transmit the one or more estimated PDPs in accordance with the SRS. The transmission component 1104 may transmit a resource allocation for the SRS, wherein the resource allocation is for a periodic, semi-persistent, or aperiodic SRS. The transmission component 1104 may transmit the one or more estimated PDPs, wherein each of the one or more estimated PDPs are associated with a PDP weight based, at least in part, on a number of antennas in a group of applicable antennas. The transmission component 1104 may transmit the one or more precoding rules. The transmission component 1104 may transmit one or more kernel types. The transmission component 1104 may transmit a configuration for calculating the interference parameter based, at least in part, on the signaling associated with the interference parameter.

The communication manager 1106 may randomly generate the one or more communication channels based, at least in part, on the one or more estimated PDPs. The communication manager 1106 may apply the one or more precoding rules to the one or more communication channels to create one or more precoded channels. The communication manager 1106 may generate random data. The communication manager 1106 may calculate a single-layer interference based, at least in part, on the random data and the one or more precoded channels. The communication manager 1106 may determine the one or more kernels based, at least in part, on the random data and one or more kernel types. The communication manager 1106 may calculate the interference parameter by applying a least-squares operation to the single-layer interference and the kernels.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a UE, comprising: receiving a configuration for receiving or calculating an interference parameter based, at least in part, on one or more estimated PDPs, one or more precoding rules, and one or more kernels, the one or more estimated PDPs being associated with one or more communication channels; and receiving a configuration for applying the interference parameter to a transmission having a power near a compression point of a power amplifier to reduce transmission non-linearities.

Aspect 2: The method of Aspect 1, further comprising transmitting one or more CSI-RS measurements, wherein the interference parameter is based, at least in part, on the one or more CSI-RS measurements.

Aspect 3: The method of Aspect 2, further comprising transmitting one or more PDP reports based, at least in part, on the one or more CSI-RS measurements.

Aspect 4: The method of Aspect 3, wherein the one or more PDP reports are based, at least in part, on an average of the one or more CSI-RS measurements associated with one or more transmitting antennas.

Aspect 5: The method of any of Aspects 1-4, further comprising transmitting an SRS.

Aspect 6: The method of Aspect 5, further comprising receiving the one or more estimated PDPs in accordance with the SRS.

Aspect 7: The method of Aspect 5, further comprising receiving a resource allocation for the SRS, wherein the resource allocation is for a periodic, semi-persistent, or aperiodic SRS.

Aspect 8: The method of any of Aspects 1-7, further comprising receiving the one or more estimated PDPs, wherein each of the one or more estimated PDPs is associated with a PDP weight based, at least in part, on a number of antennas in a group of applicable antennas.

Aspect 9: The method of any of Aspects 1-8, further comprising receiving the one or more precoding rules.

Aspect 10: The method of Aspect 9, wherein the one or more precoding rules are received via a radio resource control message.

Aspect 11: The method of Aspect 9, wherein receiving the one or more precoding rules includes receiving multiple precoding rules via radio resource control messaging and receiving a selection of one of the multiple precoding rules via MAC-CE messaging or DCI messaging.

Aspect 12: The method of any of Aspects 1-11, further comprising receiving one or more kernel types.

Aspect 13: The method of any of Aspects 1-12, wherein the configuration for receiving or calculating the interference parameter includes a configuration for randomly generating the one or more communication channels based, at least in part, on the estimated PDPs, generating one or more precoded channels, generating random data, calculating a single-layer interference, determining one or more kernels based, at least in part, on the random data and one or more kernel types, or performing a least-squares operation.

Aspect 14: A method of wireless communication performed by a network node, comprising: transmitting, or configuring a UE to calculate, an interference parameter based, at least in part, on one or more estimated PDPs, one or more precoding rules, and one or more kernels, the one or more estimated PDPs being associated with one or more communication channels; and configuring the UE to apply the interference parameter to a transmission having a power near a compression point of a power amplifier to reduce transmission non-linearities.

Aspect 15: The method of Aspect 14, further comprising receiving one or more CSI-RS measurements, wherein the interference parameter is based, at least in part, on the one or more CSI-RS measurements.

Aspect 16: The method of Aspect 15, further comprising receiving one or more PDP reports based, at least in part, on the one or more CSI-RS measurements.

Aspect 17: The method of Aspect 16, wherein the one or more PDP reports are based, at least in part, on an average of the one or more CSI-RS measurements associated with one or more transmitting antennas.

Aspect 18: The method of any of Aspects 14-17, further comprising receiving an SRS.

Aspect 19: The method of Aspect 18, further comprising transmitting the one or more estimated PDPs in accordance with the SRS.

Aspect 20: The method of Aspect 18, further comprising transmitting a resource allocation for the SRS, wherein the resource allocation is for a periodic, semi-persistent, or aperiodic SRS.

Aspect 21: The method of any of Aspects 14-20, further comprising transmitting the one or more estimated PDPs, wherein each of the one or more estimated PDPs are associated with a PDP weight based, at least in part, on a number of antennas in a group of applicable antennas.

Aspect 22: The method of any of Aspects 14-21, further comprising transmitting the one or more precoding rules.

Aspect 23: The method of Aspect 22, wherein the one or more precoding rules are transmitted via a radio resource control message.

Aspect 24: The method of Aspect 22, wherein transmitting the one or more precoding rules includes transmitting multiple precoding rules via radio resource control messaging and transmitting a selection of one of the multiple precoding rules via MAC-CE messaging or DCI messaging.

Aspect 25: The method of any of Aspects 14-24, further comprising transmitting one or more kernel types.

Aspect 26: The method of any of Aspects 14-25, further comprising transmitting a configuration for calculating the interference parameter based, at least in part, on the signaling associated with the interference parameter.

Aspect 27: The method of Aspect 26, wherein the configuration for calculating the interference parameter includes a configuration for randomly generating the one or more communication channels based, at least in part, on the estimated PDPs, generating one or more precoded channels, generating random data, calculating a single-layer interference, determining one or more kernels based, at least in part, on the random data and one or more kernel types, or performing a least-squares operation.

Aspect 28: The method of any of Aspects 14-27, further comprising: randomly generating the one or more communication channels based, at least in part, on the one or more estimated PDPs; applying the one or more precoding rules to the one or more communication channels to create one or more precoded channels; generating random data; calculating a single-layer interference based, at least in part, on the random data and the one or more precoded channels; determining the one or more kernels based, at least in part, on the random data and one or more kernel types; and calculating the interference parameter by applying a least-squares operation to the single-layer interference and the kernels.

Aspect 29: An apparatus for wireless communication at a device, comprising a processor; memory coupled with the processor; and instructions stored in the memory and executable by the processor to cause the apparatus to perform the method of one or more of Aspects 1-28.

Aspect 30: A device for wireless communication, comprising a memory and one or more processors coupled to the memory, the one or more processors configured to perform the method of one or more of Aspects 1-28.

Aspect 31: An apparatus for wireless communication, comprising at least one means for performing the method of one or more of Aspects 1-28.

Aspect 32: A non-transitory computer-readable medium storing code for wireless communication, the code comprising instructions executable by a processor to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors, the one or more processors, individually or collectively and based at least in part on information stored in the one or more memories, being configured to:

receive a configuration for receiving or calculating an interference parameter, indicative of an ergodic average of interference, based at least in part on one or more estimated power delay profiles (PDPs), one or more precoding rules, and one or more kernels, the one or more estimated PDPs being associated with one or more communication channels;

receive the one or more precoding rules via radio resource control messaging;

receive a selection of one of the multiple precoding rules via medium access control (MAC) control element (MAC-CE) messaging or downlink control information (DCI) messaging; and receive a configuration for applying the interference parameter to a transmission having a power near a compression point of a power amplifier to reduce transmission non-linearities.

2. The apparatus of claim 1, wherein the one or more processors are further configured to transmit one or more channel state information reference signal (CSI-RS) measurements, wherein the interference parameter is based, at least in part, on the one or more CSI-RS measurements.

3. The apparatus of claim 2, wherein the one or more processors are further configured to transmit one or more PDP reports based, at least in part, on the one or more CSI-RS measurements.

4. The apparatus of claim 3, wherein the one or more PDP reports are based, at least in part, on an average of the one or more CSI-RS measurements associated with one or more transmitting antennas.

5. The apparatus of claim 1, wherein the one or more processors are further configured to transmit a sounding reference signal (SRS).

6. The apparatus of claim 5, wherein the one or more processors are further configured to receive the one or more estimated PDPs in accordance with the SRS.

7. The apparatus of claim 5, wherein the one or more processors are further configured to receive a resource allocation for the SRS, wherein the resource allocation is for a periodic, semi-persistent, or aperiodic SRS.

8. The apparatus of claim 1, wherein the one or more processors are further configured to receive the one or more estimated PDPs, wherein each of the one or more estimated PDPs is associated with a PDP weight based, at least in part, on a number of antennas in a group of applicable antennas.

9. The apparatus of claim 1, wherein the one or more processors are further configured to receive one or more kernel types.

10. The apparatus of claim 1, wherein the configuration for receiving or calculating the interference parameter includes a configuration for randomly generating the one or more communication channels based, at least in part, on the estimated PDPs, generating one or more precoded channels, generating random data, calculating a single-layer interference, determining one or more kernels based, at least in part, on the random data and one or more kernel types, or performing a least-squares operation.

11. The apparatus of claim 1, wherein the interference parameter is based at least in part on randomly generated data and based at least in part on precoded output associated with the one or more precoding rules being applied to randomly generated channels.

12. An apparatus for wireless communication at a network node, comprising:

one or more memories; and one or more processors, the one or more processors, individually or collectively and based at least in part on information stored in the one or more memories, being configured to:

transmit, or configure a user equipment (UE) to calculate, an interference parameter, indicative of an ergodic average of interference, based at least in part on one or more estimated power delay profiles (PDPs), one or more precoding rules, and one or more kernels, the one or more estimated PDPs being associated with one or more communication channels;

transmit the one or more precoding rules via radio resource control messaging;

transmit a selection of one of the multiple precoding rules via medium access control (MAC) control element (MAC-CE) messaging or downlink control information (DCI) messaging; and configure the UE to apply the interference parameter to a transmission having a power near a compression point of a power amplifier to reduce transmission non-linearities.

13. The apparatus of claim 12, wherein the one or more processors are further configured to receive one or more channel state information reference signal (CSI-RS) measurements, wherein the interference parameter is based, at least in part, on the one or more CSI-RS measurements.

14. The apparatus of claim 12, wherein the one or more processors are further configured to transmit the one or more estimated PDPs, wherein each of the one or more estimated PDPs are associated with a PDP weight based, at least in part, on a number of antennas in a group of applicable antennas.

15. The apparatus of claim 12, wherein the one or more processors are further configured to transmit one or more kernel types.

16. The apparatus of claim 12, wherein the one or more processors are further configured to:

randomly generate the one or more communication channels based, at least in part, on the one or more estimated PDPs;

apply the one or more precoding rules to the one or more communication channels to create one or more precoded channels;

generate random data;

calculate a single-layer interference based, at least in part, on the random data and the one or more precoded channels;

determine the one or more kernels based, at least in part, on the random data and one or more kernel types; and calculate the interference parameter by applying a least-squares operation to the single-layer interference and the kernels.

17. A method of wireless communication performed by a user equipment (UE), comprising:

receiving a configuration for receiving or calculating an interference parameter, indicative of an ergodic average of interference, based at least in part on one or more estimated power delay profiles (PDPs), one or more precoding rules, and one or more kernels, the one or more estimated PDPs being associated with one or more communication channels;

receiving the one or more precoding rules via radio resource control messaging;

receiving a selection of one of the multiple precoding rules via medium access control (MAC) control element (MAC-CE) messaging or downlink control information (DCI) messaging; and receiving a configuration for applying the interference parameter to a transmission having a power near a compression point of a power amplifier to reduce transmission non-linearities.

18. The method of claim 17, further comprising receiving the one or more estimated PDPs, wherein each of the one or more estimated PDPs is associated with a PDP weight based, at least in part, on a number of antennas in a group of applicable antennas.

19. The method of claim 17, further comprising receiving one or more kernel types.

20. The method of claim 17, wherein the configuration for receiving or calculating the interference parameter includes a configuration for randomly generating the one or more communication channels based, at least in part, on the estimated PDPs, generating one or more precoded channels, generating random data, calculating a single-layer interference, determining one or more kernels based, at least in part, on the random data and one or more kernel types, or performing a least-squares operation.

21. The method of claim 17, further comprising, transmitting one or more PDP reports based, at least in part, on the one or more CSI-RS measurements.

22. The method of claim 21, wherein the one or more PDP reports are based, at least in part, on an average of the one or more CSI-RS measurements associated with one or more transmitting antennas.

23. The method of claim 17, further comprising:

receiving the one or more estimated PDPs, wherein each of the one or more estimated PDPs is associated with a PDP weight based, at least in part, on a number of antennas in a group of applicable antennas.

24. A method of wireless communication performed by a network node, comprising:

transmitting, or configuring a user equipment (UE) to calculate, an interference parameter, indicative of an ergodic average of interference, based at least in part on one or more estimated power delay profiles (PDPs), one or more precoding rules, and one or more kernels, the one or more estimated PDPs being associated with one or more communication channels;

transmitting the one or more precoding rules via radio resource control messaging;

transmitting a selection of one of the multiple precoding rules via medium access control (MAC) control element (MAC-CE) messaging or downlink control information (DCI) messaging; and configuring the UE to apply the interference parameter to a transmission having a power near a compression point of a power amplifier to reduce transmission non-linearities.

25. The method of claim 24, further comprising receiving one or more channel state information reference signal (CSI-RS) measurements, wherein the interference parameter is based, at least in part, on the one or more CSI-RS measurements.

26. The method of claim 24, further comprising receiving a sounding reference signal (SRS).

27. The method of claims of claim 26, wherein the one or more processors are further configured to receive the one or more estimated PDPs in accordance with the SRS.

28. The method of claim 26, further comprising:

receiving a resource allocation for the SRS, wherein the resource allocation is for a periodic, semi-persistent, or aperiodic SRS.

29. The method of claim 24, further comprising transmitting one or more kernel types.

* * * * *